United States Patent
Morisada et al.

(10) Patent No.: US 6,605,682 B2
(45) Date of Patent: Aug. 12, 2003

(54) RESIN MOLDED ARTICLE FOR OPTICAL PRODUCT AND LIGHT TRANSMITTING PLATE COMPRISING THE SAME

(75) Inventors: Ikuo Morisada, Niihama (JP); Kenji Manabe, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 31 days.

(21) Appl. No.: 09/818,571

(22) Filed: Mar. 28, 2001

(65) Prior Publication Data

US 2002/0004572 A1 Jan. 10, 2002

(30) Foreign Application Priority Data

Mar. 31, 2000 (JP) .......................................... 2000-098840

(51) Int. Cl.$^7$ ............................................... C08F 120/18
(52) U.S. Cl. ...................... 526/329.7; 526/319; 526/88; 526/329.2; 526/224; 524/89; 524/97; 524/106; 524/110
(58) Field of Search ............................... 526/329.7, 224, 526/88, 329.2, 319; 524/89, 97, 106, 110

(56) References Cited

U.S. PATENT DOCUMENTS 4,959,416 A * 9/1990 Sun ............................ 525/221
5,449,583 A * 9/1995 Murofushi et al. ..... 430/137.18
5,728,793 A    3/1998 Kumagai et al.
5,883,163 A    3/1999 Hosonuma
5,980,790 A * 11/1999 Kuwahara et al. .......... 264/101

FOREIGN PATENT DOCUMENTS

| JP | 57-135814 | 8/1982 |
| JP | 04-057810 | 2/1992 |
| JP | 04-048802 | 8/1992 |
| JP | 10-265530 | 10/1998 |

OTHER PUBLICATIONS

JIS K 6717 1997.

* cited by examiner

Primary Examiner—Tatyana Zalukaeva
(74) Attorney, Agent, or Firm—Sughrue Mion, PLLC

(57) ABSTRACT

The invention provides a resin molded article for optical products comprising a copolymer predominantly composed of methyl methacrylate and a styrenic monomer, wherein the number of foreign bodies contained in the resin molded article having a length of 210 mm, a width of 210 mm and a thickness of 3 mm as visually examined using a strain meter is about 150 or less, which is useful for a light transmitting plate employed in a liquid crystal display device because the possibility that the display screen looks whitely turbid due to the warp of the light transmitting plate, is reduced.

6 Claims, 2 Drawing Sheets

RESIN MOLDED ARTICLE FOR OPTICAL PRODUCT AND LIGHT TRANSMITTING PLATE COMPRISING THE SAME

BACKGROUND OF THE INVENTION

1. Technical Field of the Invention

The present invention relates to a resin molded article for optical products comprising a copolymer predominantly composed of methyl methacrylate and a styrenic monomer, and to a light transmitting plate comprising the same.

2. Description of Related Art

A methyl methacrylic polymer is a thermoplastic resin, which has a visible light transmittance higher than that of glass and excellent optical properties and is of low birefringence. Therefore, it has long been used as a material for a wide variety of optical products, such as optical lenses, optical discs, light transmitting plates for backlight of liquid crystal display devices, and others.

Particularly, in recent years, there is an increasing demand for its use as a light transmitting plate for backlight of a liquid crystal display device. The light transmitting plate for backlight is what has the functions of propagating and diffusing light entered from a certain direction and having the light exit in the direction of liquid crystal cell. Liquid crystal display devices is required to be thinner, therefore, an edge-lighting system is generally adopted, in which a light source is placed adjacent to an edge of the light transmitting plate.

The amount of light which is lost when traveling through the light transmitting plate increases in the edge-lighting system, since the distance in the light transmitting plate traveled by the light is relatively long. For preventing the light loss, the material of the light transmitting plate is required to have a high light transmittance. For such reason, methyl methacrylic polymers, which are excellent in terms of optical properties, have been conventionally employed for use in light transmitting plates.

However, a light transmitting plate made of a methyl methacrylate polymer has the problem of high moisture absorbency, which tends to cause dimensional changes or warp. Meanwhile, as described above, since a thinner liquid crystal display device has been demanded, even if attempting to provide the liquid crystal display device with a backlight, there is left almost no place between the light transmitting plate and a diffusing film and a reflecting sheet that are positioned on the upper and lower surfaces of the light transmitting plate respectively. Therefore, even its warp is slight, the light transmitting plate is brought into tight contact with the diffusing film, resulting in white turbidity of the display screen at an area corresponding to where the plate and the film are in tight contact. Moreover, if the dimensions of the light transmitting plate are unstable, not only assemblage of a liquid crystal display will be hindered but also the quality of the resulting display will be adversely influenced.

SUMMARY OF THE INVENTION

The object of the present invention is to provide a resin molded article for optical products which is improved in hygroscopic property, less susceptible to warp or deformation, and of high light transmission, and a light transmitting plate comprising the same.

The present inventors made intensive studies to achieve the above-described object and finally found that a molded article comprising a methyl methacrylic copolymer containing a specific amount of a styrenic monomer, and being specific in foreign body content is less susceptible to warp and almost equal in visible light transmittance to an article of a methyl methacrylic polymer. The present invention was accomplished based on this finding.

That is, the present invention provides a resin molded article for optical products comprising a copolymer predominantly composed of methyl methacrylate and a styrenic monomer, which is characterized in that the number of foreign bodies contained in the resin molded article having a length of 210 mm, a width of 210 mm and a thickness of 3 mm as visually examined using a strain meter is 150 or less; and a light transmitting plate comprising the same.

DETAILED DESCRIPTION OF THE INVENTION

Figure 1:
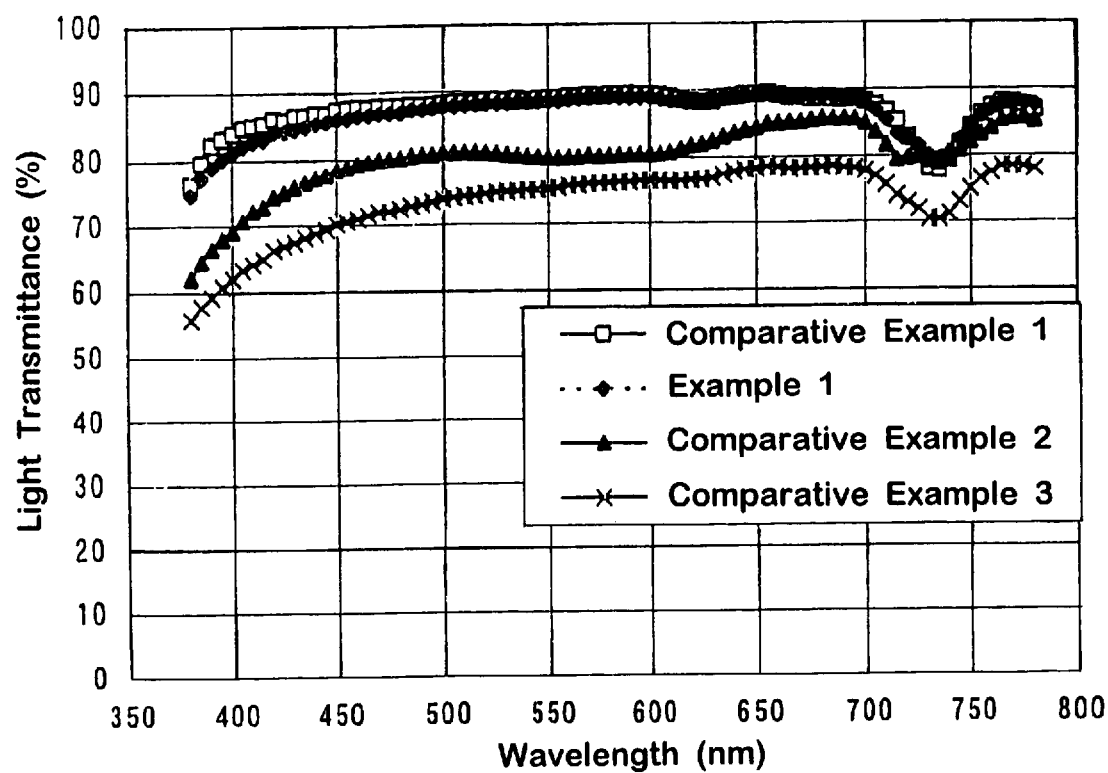
FIG. 1 is a graph showing the light transmittances in Examples and Comparative Examples.

Hereinafter, the present invention will be described in further detail. The resin molded article of the present invention comprises a copolymer predominantly composed of methyl methacrylate and a styrenic monomer.

Exemplified as the styrenic monomer are styrene and α-methylstyrene, and others.

The copolymer is preferably a polymer comprising about 90 to about 50% by weight of methyl methacrylate and about 10 to about 50% by weight of a styrenic monomer. If the proportion of the styrenic monomer is less than about 10% by weight, the moisture absorbency of the resulting copolymer will be high, resulting in greater warp of or dimensional changes in its article. The proportion exceeding about 50% by weight, however, causes a marked deterioration in light resistance and therefore is unfavorable too.

Moreover, the copolymer may be a polymer comprising methyl methacrylate, a styrenic monomer, and a monomer copolymerizable with these monomers.

Exemplified as the monomer copolymerizable with methyl methacrylate and a styrenic monomer are methacrylates such as ethyl methacrylate and butyl methacrylate; acrylates such as methyl acrylate, ethyl acrylate, and 2-ethylhexyl acrylate; unsaturated carboxylic acids such as acrylic acid, methacrylic acid, maleic acid, and itaconic acid, and acid anhydrides thereof; monomers containing hydroxy-group such as 2-hydroxyethyl acrylate, monoglycerol acrylate, and 2-hydroxyethyl methacrylate; acrylamide; acrylonitrile; allylglycidyl ether; and glycidyl methacrylate. The amount of such monomer to be added is usually up to about 10% by weight per methyl methacrylate and the styrenic monomer. The monomer is added, when required, in such an amount as not to adversely affect the effects of the present invention, i.e., in an amount of about 0 to about 10% by weight per methyl methacrylate and the styrenic monomer.

In the copolymerization of methyl methacrylate and the styrenic monomer, contaminating of foreign bodies into the copolymer has to be prevented as far as possible.

By doing so, the high light transmittance which the resin article has inherently is developed and there is provided a resin molded article characterized in that, when it has a light path length of 200 mm, the average light transmittance at light wavelengths of from 380 nm to 780 nm is about 83% or higher, preferably about 85% or higher. If the average light transmittance is lower than about 83%, the resin molded article of a copolymer predominantly composed of methyl methacrylate and a styrenic monomer will be, as an optical product, particularly as a light transmitting plate for backlight, inferior in performance.

That is, in the present invention, it is preferred that the number of foreign bodies contained in a resin molded article having a length of 210 mm, a width of 210 mm and a thickness of 3 mm as visually examined using a strain meter is about 150 or less, preferably about 50 or less. If the number of foreign bodies contained in the molded article exceeds about 150, due to the foreign bodies, the average light transmittance of the molded article will be lower than about 83%. As employedherein, the term "foreign bodies" means colored or white contaminants, including those in a variety of forms, for example, fibrous ones, flaky ones, etc.

The reason why such foreign bodies are contaminated into the polymer may be as will be explained below. In the case where the monomers are bulk-polymerized in a reactor to give a syrup and there is adopted a technique in which the syrup is cooled utilizing heat transfer through the use of a heat exchanger for removing heat generated upon polymerization and stirring, a stagnant film of the fluid, i.e., a film of the polymer is formed on the cooled surface. It is seems that the film grows to be brought into contact with and torn by, for example, a stirring blade and contaminated into the polymer as foreign bodies. Moreover, there is also known a technique of removing heat generated upon polymerization and stirring by utilizing the latent heat of the monomers. This technique, however, requires the presence of a gaseous phase within a reaction vessel to allow the monomers to evaporate. As a result, not a small portion of the polymer clings to, at the gaseous phase area or the interface of the gaseous phase and the liquid phase, the wall surface of the reaction vessel. It seems that the polymer deposit thus formed exfoliates to be contaminated into the polymer as impurities. In the present invention, according to the process, which will later be described, it is possible to reduce the number of foreign bodies contained in the copolymer to the above-mentioned level.

The resin molded article of the present invention is preferred to have a saturated water absorbency of about 1.7% by weight or less, preferably about 1.4% by weight or less. If the saturated water absorbency exceeds about 1.7% by weight, the molded article tends to warp or be poor in dimensional stability.

Hereinafter, an example of the process for producing the copolymer of the present invention will be described. In the present invention, methyl methacrylate, a styrenic monomer and, if necessary, a monomer(s) copolymerizable with these monomers are subjected to bulk polymerization in a perfect mixing type reaction vessel to give a syrup of which the polymer content is on the order of about 40 to about 70% by weight. The polymerization vessel to be employed is a vessel-type reactor equipped with a stirrer. The stirrer need only be capable of making the solution in the vessel substantially perfectly mixed, and there is no particular restriction as to the shape of its stirring blade. For enhancing the effects of stirring, it is preferred to install a baffle plate.

The reaction vessel is filled up with the solution and, in the reactor, there exists substantially no gaseous phase. Filling the vessel up with the solution prevents the formation and adhesion of polymer deposit to, at the gaseous phase area or the contact zone of the gaseous phase with the liquid phase, the interior wall of the vessel, inhibiting a decrease of the average light transmittance due to the contaminating of bits of the polymer deposit peeled off the wall surface into the copolymer. In addition, since it is possible to make effective use of the full volume of the reaction vessel, the productivity rises.

The most expedient way of filling the reaction vessel up with the solution is to provide an outlet at the highest part of the reactor. Incidentally, for preventing the evolution of gases from the monomers in the reactor, the internal pressure of the vessel is set at a pressure value not lower than the vapor pressure exerted by the solution at the solution temperature. The pressure is on the order of about 10 to about 20 kg/cm$^2$G.

Moreover, it is preferred that the reaction vessel is kept adiabatic so that it is substantially free from heat exchange between the interior and the exterior of the reaction vessel.

In other words, the temperature of the interior of the reactor and that of the exterior wall surface are adjusted so as to be almost the same. To be concrete, for example, a jacket is provided on the exterior wall surface of the reaction vessel and, trough the use of steam or other heating medium, the exterior wall surface temperature of the reaction vessel is adjusted to that of the interior so as to be almost the same.

The reaction vessel is made adiabatic in order to prevent the formation of polymer deposit as foreign bodies on its interior wall surface and stabilize the polymerization reaction. In the present invention, heat generated within the reaction vessel, i.e., heat of polymerization and stirring, is balanced with the quantity of heat taken away by the syrup upon its discharge from the vessel, and the quantity of heat taken away by the syrup is determined by the amount of the syrup, specific heat, polymerization temperature, and other factors.

Incidentally, it is also possible to carry out the reaction with the temperature of the exterior wall surface of the reaction vessel set at a value slightly higher than that of the interior for the purpose of inhibiting the formation of polymer deposit as foreign body.

The polymerization temperature is, though it depends on what kind of radical initiator is to be employed, about 120 to about 200° C., preferably about 130 to about 180° C. If the polymerization temperature is too high, the syndiotacticity of the resulting polymer will become low, leading to an increase in the amount of an oligomer which is formed. This tends to result in the deterioration in heat resistance of the resin.

The monomers, which are supplied to the polymerization reaction vessel, are not limited to fresh ones and may be unreacted ones that were recovered. Incidentally, when feeding the prepared monomers to the polymerization reaction vessel, for removing foreign bodies, they are preferred to be filtrated with a filter with a pore size of about 0.1 to about 10 μm, preferably about 0.5 to about 5 μm, whereby the number of the foreign body in the resulting polymer is reduced and the average light transmittance is increased. As the filter, one which is made of a resin such as Teflon® a sintered metal is employed. Efficient filtration is made possible by adjusting the area of the filter according to the amount of the monomers which are filtered per unit time.

Moreover, the average residence time in the polymerization reaction vessel is about 15 minutes to about 2 hours, preferably about 20 minutes to about 1.5 hours. If the residence time is too long, the amount of an oligomer(s) such as dimer or trimer which is formed will increase, leading to the possibility of deterioration in heat resistance of the resin. The average residence time can be regulated by changing the amount of the monomers which is supplied per unit time.

There is no particular restriction as to the radical initiator to be employed in the present invention provided that its half-life period at the polymerization temperature is within about 1 minute. Therefore, any of a variety of azo compounds, organic peroxides, and others can be employed. The use of a radical initiator with a half-life period exceeding about 1 minute causes the retardation of the reaction rate and therefore is unfavorable.

Examples of the azo compound, which is employed, are azobisisobutyronitrile and azobisdimethylvaleronitrile. As the organic peroxide, there are mentioned, for example, benzoyl peroxide, lauroyl peroxide, and acetyl peroxide.

It is preferred that the concentration C of the radical initiator (mol/100 g monomer) is such as to fall within a range calculated by the following formula:

$$4\times10^{-5}\cdot\exp(0.019T)<C\cdot\Theta<3\times10^{-8}\cdot\exp(0.079T)$$

wherein $\Theta$ represents the average residence time(min.) and T represents the polymerization temperature (° C.).

If the concentration of the radical initiator is below the lower limit defined by this formula, a predetermined degree of polymerization cannot be achieved. If the concentration is too high, the resulting polymer will be poor in heat stability, and this is unfavorable. Incidentally, this concentration range corresponds to the amount of from about 0.001 to about 1% by weight relative to the monomers. The radical initiator may be fed to the reactor after having been dissolved in the monomers.

In the bulk polymerization according to the present invention, the selection of the reaction conditions according to the above description leads to the development of the self-accelerating effect (gel effect) in the radical polymerization, which can stably impart a favorable effect to the polymerization reaction. Generally, the gel effect develops in a monomer solution having a somewhat high polymer content. Thus, if the polymer content is high, the viscosity of the solution will be high and the mobility of the polymer radicals will be hampered, which leads to the acceleration of the polymerization rate because the termination reaction is hard to occur. Therefore, inherently a runaway reaction tends to take place. However, in the present invention, such runaway reaction is inhibited by conducting the polymerization in such a manner that there is substantially no difference in temperature between the interior and exterior of the reactor to establish a thermally insulated state with substantially no exchange of heat with the external environment, and therefore the polymerization stably proceeds.

The conversion from the monomers to the polymer in the reactor is about 40 to about 70% by weight. Because the content of the reactor is in a substantially completely mixed state, this conversion corresponds to the polymer content of the syrup flowing out of the reactor. That is to say, the conversion is equal to the concentration of the polymer in the syrup.

In order to control the molecular weight of the product polymer, a conventional monofunctional or polyfunctional chain transfer agent can be employed, examples of which are alkylmercaptans such as propyl mercaptan and n-octyl mercaptan; and aromatic mercaptans such as phenyl mercaptan.

The syrup withdrawn from the reactor is preheated, if required, to evaporate off the volatile material, which is predominantly composed of unreacted monomers, leaving the desired polymer. Suitable for transferring the syrup is the technique of heating the interior wall surface of the transfer zone at about 150 to about 290° C. up to a temperature not lower than that of the syrup and transferring the syrup substantially in a liquid state under a pressure of about 1 to about 20 atmospheres (Japanese Patent Publication No. Hei 4-48802). As the technique for separating the volatile material through evaporation, a method employing a degassing extruder is suitable, and such method is described in, for example, Japanese Patent Publication Nos. 51-29914 and 52-17555, Japanese Patent Application Laid-Open Nos. 1-53682 and 3-49925.

The copolymer thus obtained is cut to pieces of convenient size, for example, in the form of pellets and used as a molding material for producing light transmitting plates, and others.

For the molding of a light transmitting plate, any of known molding methods that are employed for the molding of thermoplastic resins, such as injection molding, extrusion molding and press molding, can be adopted.

For making the mold releasing property upon molding better, a technique of adding at least one compound selected from the ester of a polyhydric alcohol with a fatty acid, a monovalent alkyl alcohol, a fatty acid, a fatty acid amide, and a fatty acid metal salt to the copolymer (Japanese Patent Application Laid-Open No. 61-73754); a technique of adding a glycerol fatty acid ester and a saturated aliphatic alcohol to the copolymer (Japanese Patent Application Laid-Open No. 1-294762); a technique of adding, e.g., glyceride of stearic acid, glyceride of behenic acid, or a fatty acid alkyl ester to the copolymer (Japanese Patent Application Laid-Open No. 2-115255), or the like may be employed.

If necessary, to the copolymer may be added an ultraviolet ray absorber, an antioxidant, a light diffusing agent, a dye, a pigment, and others provided that the effects of the present invention are not adversely affected.

EXAMPLES

Hereinafter, the present invention will be described in further detail based on the following examples and these should by no means be construed as defining the scope of the invention.

The resin molded article was evaluated in the following manner.
(1) Light Transmittance The pellets obtained were injection-molded by an injection molding machine (IS-130FII manufactured by Toshiba Machine Co., Ltd.) with its cylinder temperature set at 240° C. to provide a resin molded article having a length of 200 mm, a width of 120 mm and a thickness of 3 mm.

According to JIS K 7105, the color difference and yellowness index (YI) of the obtained resin molded article were determined using a spectrophotometer (U-3410 manufactured by Hitachi Ltd.). Light transmittance was measured by having light travel through the resin molded article in its longitudinal direction. At light wavelengths ranging from 380 nm to 780 nm, light transmittance was measured for every 5 nm.
(2) Foreign Body The number of foreign bodies contained in the molded article having a length of 210 mm, a width of 210 mm and a thickness of 3 mm obtained was visually examined using a strain meter (HEIDON-13 manufactured by SHINTO Scientific Co., Ltd.). Further, the size of each foreign body was measured using an optical microscope with a magnification of 20 and the number of foreign bodies within each size range was counted using the dirt comparison chart (published Mint Bureau of Ministry of Finance).

(3) Saturated Water Absorbency

A molded article having a thickness of 3 mm formed using an extruder (manufactured by Tanabe Plastics Machinery Co., Ltd.) was cut into a test sample having a length of 100 mm, a width of 50 mm and a thickness of 3 mm. After having been weighed, the test piece was immersed in pure water at 23° C. After having been saturated with water, the weight of the test piece was measured to figure out its saturated water absorbency.

Example 1

To a catalyst mixing vessel was fed, in addition to methyl methacrylate, 1,1-di-t-butyl peroxy-3,3,5-trimethylsiloxane as a radical initiator in such an amount as to be 0.08% by weight. The ingredients were mixed through stirring to give a catalyst solution. Meanwhile, a mixed monomer solution was prepared by charging a monomer mixing vessel with, besides methyl methacrylate, styrene and n-octyl mercaptan as a chain transfer agent so that their concentrations were 19.6% by weight and 0.07% by weight, respectively, and mixing the ingredients through stirring. The catalyst solution and the mixed monomer solution prepared above were supplied to a polymerization reaction vessel from its bottom at a rate of 1.8 kg/hour and a rate of 16 kg/hour, respectively. With the average residence time set for 40 minutes and the polymerization reaction temperature at 175±2° C., a polymerization reaction was carried out. During the reaction, the exterior wall surface temperature of the reaction vessel was kept at the same as that of the polymerization reaction or at a temperature slightly higher than that by circulating steam through a jacket provided on the exterior wall surface. The syrup thus obtained was drained from the top of the reaction vessel and then fed to a heater. In the heater, the syrup was heated up to 200° C. by circulating a heating medium through its jacket. The syrup in a liquid state was then fed to a degassing extruder. With the vents of the degassing extruder set to a reduced pressure and the cylinder temperature set at about 240° C., the volatile fraction predominantly composed of unreacted monomers was withdrawn from the vents. The molten copolymer was extruded in the form of a strand, cooled with water, and pelletized.

Analysis of the composition of the copolymer obtained revealed that it was composed of 81% by weight of methyl methacrylate and 19% by weight of styrene. The melt flow rate determined under the conditions of 230° C. and a load of 37.3N was 4.3 g/10 min.

160 g of the pellets was fed to a mold and heat-pressed both downward and upward at 200° C. to give a resin molded article having a length of 210 mm, a width of 210 mm and a thickness of 3 mm.

The results of measurements of the foreign bodies contained in the resin molded article are shown in Table 2.

The color difference, yellowness index (YI), and the average light transmittance at light wavelengths within the range of from 380 nm to 780 nm of the molded article are shown in Table 1.

Moreover, the light transmittances measured for light wavelengths ranging from 380 nm to 780 nm are shown in FIG. 1. The average light transmittances shown in Table 1 are values calculated from the results of measurement shown in FIG. 1.

Example 2

To a catalyst mixing vessel was fed, in addition to methyl methacrylate, 1,1-di-t-butyl peroxy-3,3,5-trimethylsiloxane as a radical initiator in such an amount as to be 0.15% by weight. The ingredients were mixed through stirring to give a catalyst solution. Meanwhile, a mixed monomer solution was prepared by charging a monomer mixing vessel with, besides methyl methacrylate, styrene and n-octyl mercaptan as a chain transfer agent so that their concentration were 28.4% by weight and 0.045% by weight, respectively, and mixing the ingredients through stirring. The catalyst solution and the mixed monomer solution prepared above were supplied to a polymerization reaction vessel from its bottom at a rate of 3.0 kg/hour and a rate of 26.9 kg/hour, respectively. With the average residence time set for 24 minutes and the polymerization reaction temperature at 175±2° C., a polymerization reaction was carried out. During the reaction, the exterior wall surface temperature of the reaction vessel was kept at the same as that of the polymerization reaction or at a temperature slightly higher than that by circulating steam through a jacket provided on the exterior wall surface. The syrup thus obtained was drained from the top of the reaction vessel and then fed to a heater. In the heater, the syrup was heated up to 200° C. by circulating a heating medium through its jacket. The syrup in a liquid state was then fed to a degassing extruder. With the vents of the degassing extruder set to a reduced pressure and the cylinder temperature set at about 240° C., the volatile fraction predominantly composed of unreacted monomers was withdrawn from the vents. The molten copolymer was extruded in the form of a strand, cooled with water, and pelletized.

Analysis of the composition of the copolymer obtained revealed that it was composed of 70% by weight of methyl methacrylate and 30% by weight of styrene. The melt flow rate determined under the conditions of 230° C. and a load of 37.3N was 8.2 g/10 minutes.

As in Example 1, a resin molded article having a length of 210 mm, a width of 210 mm and a thickness of 3 mm was formed. The results of evaluation are shown in Tables from 1 to 3.

The light transmittances measured for light wavelengths ranging from 380 nm to 780 nm were almost the same as those in Example 1 shown in FIG. 1.

Comparative Examples 1 to 3

For comparison, a methyl methacrylic resin and a methacrylic acid-styrene copolymer, which are commercially available for use in optical products, were also evaluated in the same manner as in Examples.

(1) Methyl methacrylic resin (methyl methacrylate content: about 96% by weight, methyl acrylate content: about 4% by weight, melt flow rate measured under the conditions of 230° C. and a load of 37.3N:5.1 g/10 minutes (analytical value) (Comparative Example 1)

(2) Methacrylic acid-styrene copolymer for optical products (methyl methacrylate content: about 60% by weight, styrene content: 40% by weight (analytical value)) (Comparative Example 2)

(3) Methacrylic acid-styrene copolymer for optical products (methyl methacrylate content: about 80% by weight, styrene content: 20% by weight (analytical value)) (Comparative Example 3)

Example 3

Figure 2:
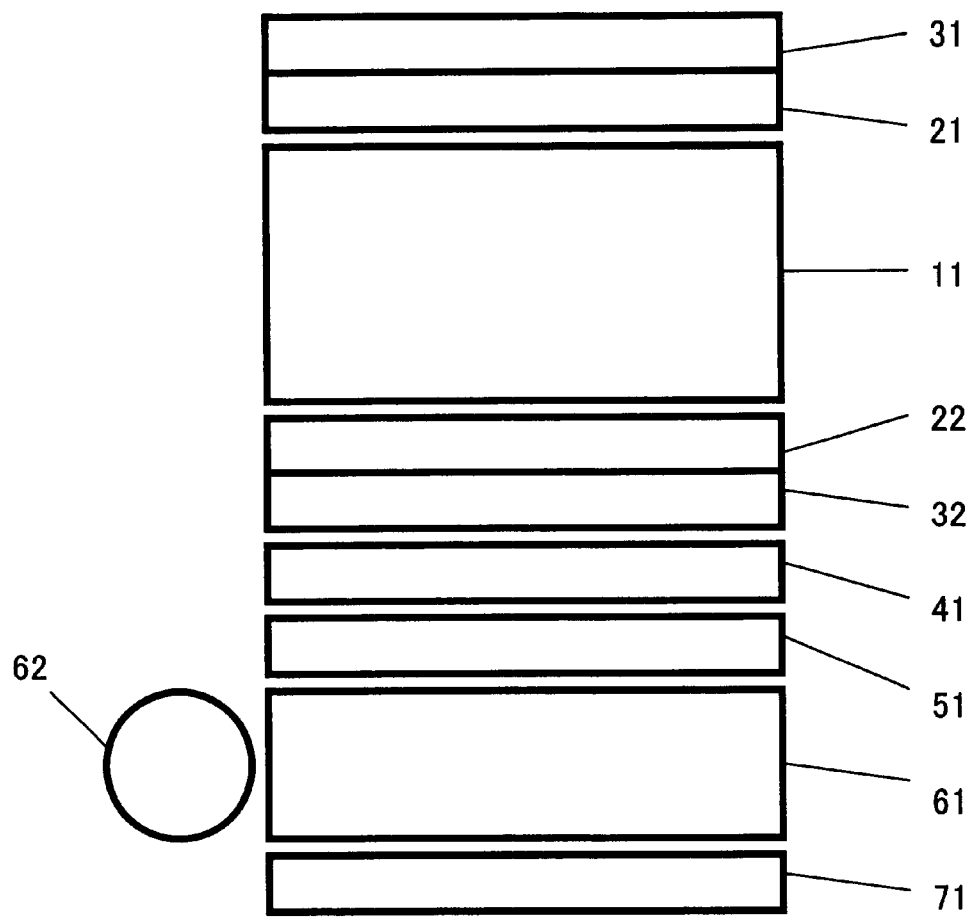
FIG. 2 is a cross-sectional schematic view showing one embodiment of a liquid crystal display device employing the light transmitting plate of the present invention.

Using a light transmitting plate fabricated through the injection-molding of pellets obtained in the same manner as in Example 1, a liquid crystal cell (11), retardation films (21, 22), polarizing films (31, 32), a lens sheet (41), a light diffusing sheet (51), the light transmitting plate (61), a light source (62), and a reflection sheet (71) are disposed in such a manner as are illustrated in a cross-sectional schematic view as FIG. 2 to provide a liquid crystal display device. This liquid crystal display device is almost free from the problem that, due to the warp of the light transmitting plate, its display screen looks whitely turbid.

TABLE 1

|  | L* | a* | v* | YI | Average light transmittance % |
|---|---|---|---|---|---|
| Example 1 | 95.35 | −0.62 | 1.90 | 3.42 | 86.40 |
| Example 2 | 95.21 | −0.53 | 1.80 | 3.29 | 86.05 |
| Comparative example 1 | 95.52 | −0.39 | 1.19 | 2.23 | 87.00 |
| Comparative example 2 | 91.97 | −0.36 | 1.86 | 3.66 | 80.04 |
| Comparative example 3 | 89.59 | −0.86 | 4.36 | 8.29 | 73.44 |

TABLE 2

|  | Number of various foreign bodies | | | | | | | | | Total number of foreign bodies |
|---|---|---|---|---|---|---|---|---|---|---|
|  | Sizes of colored foreign bodies (mm²) | | | | | Sizes of whity foreign bodies (mm²) | | | | |
|  | <0.01 | 0.01~0.04 | 0.04~0.1 | 0.1~0.2 | 0.2< | <0.01 | 0.01~0.04 | 0.04~0.1 | 0.1< | |
| Example 1 | 3 | 0 | 0 | 0 | 0 | 13 | 4 | 1 | 0 | 21 |
| Example 2 | 5 | 0 | 0 | 0 | 0 | 15 | 5 | 1 | 0 | 26 |
| Comparative example 2 | 140 | 28 | 0 | 0 | 0 | 36 | 12 | 0 | 0 | 216 |
| Comparative example 3 | 1280 | 96 | 96 | 2 | 0 | 256 | 32 | 32 | 1 | 1795 |

TABLE 3

|  | Content of saturated water |
|---|---|
| Example 1 | 1.2 wt.% |
| Example 2 | 1.0 wt.% |
| Comparative example 1 | 2.0 wt.% |

The resin molded article of the present invention has a visible light transmittance equal or similar to that of a methacrylic resin molded article, is less susceptible to warp, and good in dimensional stability. Thus, in a liquid crystal display device comprising a light transmitting plate constituted of the resin molded article of the present invention, the possibility that its display screen looks whitely turbid due to the warp of the light transmitting plate, is reduced.

What is claimed is:

1. A resin molded article
   containing about 150 or less of foreign bodies per volume having a length of 210 mm, a width of 210 mm and a thickness of 3 mm as visually examined under a strain meter and determined by optical microscopy;
   having an average light transmittance of about 83% or higher at light wavelengths of from 380 nm to 780 nm when the light transmittance is measured in the condition that the light travels through the resin molded article in a distance of 200 mm; and
   comprising a copolymer which is obtained by a process comprising the steps of:
   (i) feeding a solution comprising a methyl methacrylate and a styrenic monomer through a filter with a pore size of about 0.1 μm to about 10 μm into a reaction vessel, and
   (ii) polymerizing the solution with bulk polymerization in the condition that the vessel is filled up with the solution leaving substantially no gas phase in the vessel, and that the vessel is maintained in a thermally insulated state allowing substantially no exchange of heat with the external environment, to obtain a methacrylate polymer.

2. The resin molded article for optical products according to claim 1, wherein a content of water absorbed by the resin molded article is about 1.7% by weight or less when the article is saturated with water at 23° C.

3. The resin molded article for optical products according to claim 1, wherein the copolymer comprises about 90 to about 50% by weight of methyl methacrylate and about 10 to about 50% by weight of the styrenic monomer.

4. The resin molded article for optical products according to claim 1, wherein the copolymer comprises about 90 to about 50% by weight of methyl methacrylate, about 10 to about 50% by weight of the styrenic monomer, and about 0 to about 10% by weight of a monomer copolymerizable with methyl methacrylate and the styrenic monomer.

5. The resin molded article for optical products according to claim 1, wherein the copolymer is formed by filling up a perfect mixing type reaction vessel with a solution of monomers and a initiator with substantially no place for a gaseous phase, insulating thermally the reaction vessel with substantially no exchange of heat with an external environment, bulk polymerizing monomers predominantly composed of methyl methacrylate and a styrenic monomer in the reaction vessel to give a syrup having a polymer content of 40 to 70% by weight, and separating a volatile fraction predominantly composed of unreacted monomers from the syrup through evaporation.

6. A light transmitting plate comprising the resin molded article according to claim 1.

* * * * *